US008088206B2

United States Patent
Bentley

(10) Patent No.: US 8,088,206 B2
(45) Date of Patent: Jan. 3, 2012

(54) INKJET PRINTING USING SOLVENT-BASED INK COMPOSITIONS

(75) Inventor: Philip Gareth Bentley, Cambridge (GB)

(73) Assignee: Xennia Technology Limited, Letchworth, Hertfordshire (GB)

( * ) Notice: Subject to any disclaimer, the term of this patent is extended or adjusted under 35 U.S.C. 154(b) by 253 days.

(21) Appl. No.: 12/518,345

(22) PCT Filed: Dec. 14, 2007

(86) PCT No.: PCT/GB2007/004821
§ 371 (c)(1),
(2), (4) Date: Jun. 9, 2009

(87) PCT Pub. No.: WO2008/071994
PCT Pub. Date: Jun. 19, 2008

(65) Prior Publication Data
US 2010/0047457 A1 Feb. 25, 2010

(30) Foreign Application Priority Data

Dec. 14, 2006 (GB) .................................. 0624894.2

(51) Int. Cl.
*C09D 11/02* (2006.01)
(52) U.S. Cl. ...................... 106/31.13; 347/100; 524/560

(58) Field of Classification Search ................... 524/560; 347/100; 106/31.13
See application file for complete search history.

(56) References Cited

U.S. PATENT DOCUMENTS

| 4,389,503 A | | 6/1983 | Maxwell et al. ................. 524/38 |
| 5,275,646 A | * | 1/1994 | Marshall et al. ............ 106/31.32 |
| 7,649,026 B2 | * | 1/2010 | Allen et al. ..................... 522/42 |
| 7,816,425 B2 | * | 10/2010 | Hudd et al. .................... 523/160 |
| 2003/0158283 A1 | | 8/2003 | Ylitalo et al. .................... 522/74 |
| 2005/0159501 A1 | * | 7/2005 | Kiefer-Liptak ................. 522/71 |
| 2006/0001719 A1 | * | 1/2006 | Fukushige ..................... 347/100 |
| 2006/0054040 A1 | * | 3/2006 | Daems et al. .............. 101/463.1 |
| 2008/0274321 A1 | * | 11/2008 | Lefaux et al. ................... 428/38 |

FOREIGN PATENT DOCUMENTS

JP 2005 298757 A 10/2005

* cited by examiner

*Primary Examiner* — David W Wu
*Assistant Examiner* — Vu A Nguyen
(74) *Attorney, Agent, or Firm* — Morgan Lewis & Bockius LLP

(57) ABSTRACT

There is provided a transparent, single-phase, radiation-curable ink composition for inkjet printing white, opaque features on porous and non-porous substrates, which are excellent in color reproducibility, hiding power, and adhesiveness to the substrate, for particular application as base layer coatings.

12 Claims, No Drawings

INKJET PRINTING USING SOLVENT-BASED INK COMPOSITIONS

This application is a 371 filing of PCT/GB2007/004821 (WO 2008/071994), filed Dec. 14, 2007, claiming priority benefit of GB 0624894.2, filed Dec. 14, 2006.

FIELD OF THE INVENTION

This invention relates to inkjet printing and concerns a single-phase curable inkjet ink for producing an opaque image on a substrate, and a method of inkjet printing. The ink has particular application as a base layer coating.

BACKGROUND TO THE INVENTION

Inkjet printing processes fall into two main types: continuous processes and drop-on-demand (DOD) processes. Continuous processes use electrically conductive inks to produce a stream of electrically-charged ink drops that are deflected by an electric field to an appropriate location on a substrate. In DOD processes, individual drops of ink are expelled from the nozzle of a printhead either by vibration of a piezoelectric actuator (in piezoelectric inkjet printing) or by heating the ink to form a vapourised gas bubble (in thermal inkjet printing, also known as bubblejet printing).

Inks for ink jet printing are required to have viscosity values that will enable effective ink flow through the fine nozzles of the printhead without causing clogging of the same. Considerable effort has therefore been extended to the successful development of cyan, magenta, yellow and black (CMYK) inks for full colour printing acceptable for use in inkjet printers; however providing an acceptable white inkjet ink presents particular problems.

White inks used to form the undercoat or base layer on a substrate need to have good hiding power in printed form. Conventional white inkjet ink compositions typically rely on particulates (pigments) to achieve the required opacity desirable of a film for use as base layer coatings.

An inkjet printing ink composition containing such particulates, however, presents special problems. For example, the particulates must be ground to acceptable sizes to prevent the particulates from plugging the small printhead orifices. A small particulate size is further necessary to ensure that uniform ink droplets are reliably formed at the printhead nozzle plate.

Titanium dioxide ($TiO_2$) is one such pigment which has been widely applied to the development of white inkjet ink formulations. However, the dispersions of this pigment are hampered by the high specific gravity of the $TiO_2$ rutile (4.2) and anatase (3.9) polymorphs, which cause the pigment to hard-settle when the ink is allowed to stand for an extended period of time. This lack of dispersion stability is partly circumvented by employing inkjet printers with integrated ink recirculation systems, enabling the ink to be agitated periodically to prevent hard settling of the pigment. However, $TiO_2$ based white inks for inkjet printers reliant on the use of ink cartridges are totally impracticable.

The use of $TiO_2$ as an opacifying agent in white inkjet inks is further precluded on the grounds of the extreme hardness of this ceramic, which accelerates wear to the nozzle portions of an inkjet printhead. Other less hardwearing inorganic white colourants that have been applied to inks include zinc oxide, barium sulfate, and certain clays, while a number of organic colourants such as the resin fillers based on acrylic, styrene, melamine, or the like, have also been employed.

JP 63254176, JP2000-103995, and U.S. Pat. No. 4,880,465 all disclose white ink formulations comprising hollow polymer microparticles as the white colourant in the ink. Hollow polymer microparticles have a specific gravity close to 1 and are therefore less prone to settling, thereby providing a solution to the problem of ink clogging caused by the settling of pigment.

The prior art also discloses radiation-curable white inkjet ink compositions that include monomers that are curable in response to appropriate stimulus (ultraviolet (UV), infra red (IR), microwave or heat). However, those known $TiO_2$ based white inks are hindered by the ability of the pigment to reflect UV light, thus preventing the ink film from curing fully (see Japanese Laid-Open Patent Application No. H9-183929).

A number of prior art documents disclose resin-based inkjet inks comprising neither pigment nor dye, which are capable of producing opaque films through evaporation of the liquid vehicle. The resulting films comprise a multiplicity of microvoids that scatter incident light thereby producing an opaque image.

For example, U.S. Pat. No. 4,389,503 concerns non-pigmented inkjet inks comprising film-forming cellulose ester, resin binding agent and a solvent blend. The solvent blend comprises a volatile organic solvent component in which the film former and resin are soluble, e.g. methanol, acetone etc. and a less volatile (non-solvent) component (preferably water) in which the film former is essentially insoluble. The film former is initially fully dissolved in the solvent blend. On application, the volatile component evaporates rapidly (in 2 to 3 seconds), initially leaving behind the non-solvent. On subsequent evaporation of the non-solvent microvoids are produced, providing the opaque effect. The compositions thus use differential evaporation rates to produce voids. Such a composition relies on the fact that after its application to a substrate the solvent/non-solvent ratio of the solvent blend shifts so that the deposited ink becomes rich in non-solvent and deficient in solvent. In effect, phase-inversion occurs, causing the formation of a film having a plurality of microvoids. One of the problems associated with this ink is that the proper formation of the microvoids is critically dependent upon the conditions under which the ink is deposited. Further, because a delicate balance between the solvent/non-solvent ratio must be retained, the composition must be stored and used only under tightly controlled conditions: otherwise the ink is not able to maintain the ink solvent balance necessary to preserve a stable image and excessive variation in the quality of the opaque image results.

U.S. Pat. No. 5,710,195 and U.S. Pat. No. 5,674,923 similarly concern inkjet inks for producing opaque, non-pigmented film, using a solvent blend to obtain differential evaporation and hence production of voids.

U.S. Pat. No. 4,207,577 concerns inkjet inks for producing opaque images comprising resins/polymers, especially celluloses (for adhering to a substrate), solvent for the resin comprising a mixture of an aliphatic monovalent alcohol e.g. methanol etc. and a keytone/aldehyde/ether/ester/hydrocarbon/glycol/glycol ether/lactone etc., e.g. a mixture of methanol and methyl ethyl ketone. An opaque image is obtained by applying moisture to a printed image or by adjusting the temperature to the dew point.

U.S. Pat. No. 4,258,367 concerns inkjet inks including a light sensitive diazonium compound that responds to UV to produce an opaque image.

JP 2005-298757 concerns UV-curable inkjet inks that produce non-pigmented white opaque images. The inks use low boiling point solvents (having a boiling point in the range 40 to 110° C.) that evaporate to produce pores.

However, these inks have been formulated using low boiling solvent vehicles to enable fast evaporation of the solvent. The use of low boiling solvents generally precludes the ability to form and maintain a stable, high quality opaque image, due to excessive variation in the quality of the final film.

U.S. Pat. No. 3,823,027 concerns relatively thick opaque coatings, not needing pigment, that are produced from compositions comprising curable actinic light-sensitive monomers or pre-polymers, e.g. acrylic resins, and 10 to 70% solvent having a boiling point of at least 115° F. (46° C.) and a flash point of at least 50° F. (10° C.). The extent of solubility of the solvent with the curable materials is critical for the generation of voids, and hence opacity, during curing on exposure to actinic radiation. The coatings are intended to be applied by roll coating, spraying or dip coating.

SUMMARY OF THE INVENTION

According to the present invention there is provided a single-phase curable inkjet ink for producing opaque images on a substrate, comprising curable material; and solvent in which the curable material is soluble or miscible and in which the curable material after full or partial curing is insoluble or immiscible.

The inkjet ink has appropriate properties so that it is capable of being deposited by an inkjet printing process as discussed above, particularly drop-on-demand processes (piezoelectric and thermal). The ink typically has a viscosity (at 25° C.) of less than 50 mPa·s, preferably less than 35 mPa·s. In the specification, all viscosity valves are at 25° C. unless otherwise stated.

The term "single-phase" is used to mean that the curable material is fully in solution, being dissolved in solvent or being fully miscible therewith. No phase separation or settlement occurs. The single-phase composition may nevertheless possibly carry other materials in solid form to achieve required application properties.

In use, the ink of the invention is deposited on a substrate by inkjet printing to form a wet film, which may be in the form of either a coating or a patterned image. The film is exposed to a suitable curing stimulus to cause curing and hardening of the curable material. The curable material, after fall or partial curing, becomes insoluble in the solvent, resulting in phase separation. In addition, heat from the curing stimulus and generated in the curing reaction causes evaporation of the solvent. These two effects result in the formation of a solid printed image that has a reticulated structure containing a multiplicity of microvoids within and on the surface of the dried film which act to scatter incident light to produce an opaque, usually white, image without the ink needing to contain pigment. The inks of the invention can thus be non-pigmented, avoiding the problems noted above, yet produce opaque films. The curing process can assist production of a solvent-resistant film that hardens and adheres well to the substrate.

It is necessary to control carefully the rate of evaporation of solvent in order to produce voids of appropriate size to generate an opaque film. If solvent evaporates too quickly, then the voids are too large to scatter light and do not produce an opaque film. However, it is also necessary for solvent to be evaporated sufficiently quickly so that it is not retained in the film, as this has an adverse effect on film properties. An appropriate balance can be obtained by regulating factors including the choice of solvent, quantity of solvent and curing conditions, particularly curing temperature and rate.

The curable material hardens on curing following exposure to a suitable curing stimulus after printing to form a film of printed material. The material is typically radiation-curable, curing in response to exposure to suitable radiation such as ultra violet (UV) heat, infrared or electron beam radiation, with appropriate initiators being used in the ink if required.

The term "radiation-curable" refers to functionality directly or indirectly pendant from a monomer, oligomer, polymer, or other constituent (as the case may be) that participate in polymerization and/or crosslinking reactions upon exposure to a suitable source of curing energy. Such functionality generally includes not only groups that cure via a cationic mechanism upon energy exposure but also groups that cure via a free-radical mechanism. Representative examples of radiation-curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like.

The energy source used for achieving polymerization and/or crosslinking of the curable functionality is preferably actinic, including radiation having a wavelength in the ultraviolet or visible region of the spectrum, accelerated particles (e.g. electron beam radiation), thermal (e.g. heat or infrared radiation), or the like. Use of actinic radiation enables excellent control over the initiation and rate of polymerization and/or crosslinking. Additionally, actinic radiation can be used for curing at relatively low temperatures. This avoids degrading or evaporating components that might be sensitive to the relatively high temperatures that might be required to initiate polymerization and/or crosslinking of the energy curable groups when using high temperature curing techniques. Suitable sources of curing energy include lasers, electron beams, mercury lamps, xenon lamps, carbon arc lamps, tungsten filament lamps, sunlight, low intensity ultraviolet light (UV), and the like. The use of UV light for polymerization tends to form higher molecular weight polymers as compared to many other kinds of curing energy. Accordingly, when it is desired to form higher molecular weight materials upon curing, the use of UV light is preferred.

It will be appreciated that different curable material(s) and mixtures thereof, may be better suited for different printing systems, printing applications and/or printing media.

Curable Material

The curable material may comprise a single material or a mixture of materials and typically comprises one or more curable monomers, particularly acrylate monomers (where the term acrylate encompasses methacrylates).

The curable material is conveniently present in an amount in the range 5 to 90% by weight of the total weight of the composition, preferably 10 to 80%, more preferably 25 to 80%, yet more preferably 40 to 80%.

The curable materials may include a mixture of acrylate materials of different functionality, selected from monofunctional acrylate, difunctional acrylate and trifunctional acrylate. Materials with different functionality have different properties, e.g. in terms of viscosity, water solubility and film-forming properties in terms of hardness and water resistance, so by using a mixture of materials of different functionality so a composition with a good overall balance of properties can be achieved.

The curable material preferably includes one or more difunctional materials, desirably difunctional acrylate monomers, suitably present in an amount in the range 30 to 80% by weight of the composition. Difunctional acrylates have a good balance of properties and have the benefit of being reasonably reactive, so giving good curing rate and crosslinking density, and also having food solvent resistance, giving rise to good film properties in terms of water/chemical resistance, scratch resistance and durability. They also have moderate viscosities and produce films with low shrinkage and good flexibility on curing. Diacrylate material may be used as the sole curable material, or may be used in a mixture with materials of different functionality.

The curable material may include one or more monofunctional materials, desirably monofunctional acrylate monomer, with such materials having the benefit of good solvency, low viscosity, high flexibility, good adhesion to plastics and other difficult substrates, and good wetting properties. Suitable monofunctional acrylate monomers include acrylates and methacrylates etc., with acrylates being preferred. Monofunctional curable material may be used in generally similar amounts to difunctional curable material, as discussed above.

Curable materials having more than three functionalities can have benefits of increasing cross-linking density, chemical resistance and scratch resistance of printed films, but such materials have high viscosities and so should be used, if present, in low quantities, typically not in excess of 15%, e.g. at levels of 7 or 8% or lower.

Suitable commercially available materials include the following UV-initiated free-radically curable materials available from Sartomer (identified by SR and CD codes) and from Akzo Nobel (identified by the Trade Mark Actilane).
1,6-hexanediol diacrylate (HDDA) (SR238)
difunctional acrylate monomer (SR4423)
dipropylene glycol diacrylate (DPGDA) (SR508)
tripropylene glycol diacrylate (TPGDA) (SR306)
propoxylated (2) neopentyl glycol diacrylate (PONPGDA) (SR 9003)
tridecyl acrylate (TA) (SR489)
isodecyl acrylate (IDA) (SR395)
2-phenoxyethyl acrylate (PEA) (SR339C)
lauryl acrylate (LA) (SR335)
2-(2-ethoxyethoxy) ethyl acrylate (EOEOEA) (SR256)
tetrahydrofurfuryl acrylate (THFA) (SR285)
isobornyl acrylate (IBOA) (SR506D)
tetrahydrofurfurylmethacrylate (THFMA) (SR203)
2-phenoxyethyl methacrylate (PEMA) (SR 340)
isobornyl methacrylate (IBOMA) (SR423)
polyester acrylate (Actilane 505, CN 2505)
dipentaerythritol hexaacrylate (DPHA) (Achlane 450)
stearyl acrylate (SR257, CD 586D)
isooctyl acrylate (SR440)
isotridecyl acrylate (SR489D)
1,3-butylene glycol diacrylate (SR212)
1,4-butanediol diacrylate (SR213)
ethoxylated (3) bisphenol A diacrylate (SR349)
tris(2-hydroxyethyl) isocyanurate triacrylate (SR368)
trimethylolpropane triacrylate (SR351)
polyethylene glycol (200) diacrylate (SR259)
tetraethylene glycol diacrylate (SR268)
triethylene glycol diacrylate (SR272)
tripropylene glycol diacrylate (SR306)
polyethylene glycol (400) diacrylate (SR344)
30 mole ethoxylated bisphenol A diacrylate (CD9038)
pentaerythritol tetraacrylate (SR295)
di-trimethylolpropane tetraacrylate (SR355)
dipentaerythritol pentaacrylate (SR399)
20 mole ethoxylated trimethylolpropane triacrylate (SR415)
pentaerythritol triacrylate (SR444)
3 mole ethoxylated trimethylolpropane triacrylate (SR454)
3 mole propoxylated trimethylolpropane triacrylate (SR492)
6 mole ethoxylated trimethylolpropane triacrylate (SR499)
6 mole propoxylated trimethylolpropane triacrylate (SR501)
9 mole ethoxylated trimethylolpropane triacrylate (SR502)
propoxylated (3) glyceryl triacrylate (SR9020)
highly propoxylated glyceryl triacrylate (SR9021)
15 mole ethoxylated trimethylolpropane triacrylate (SR9035, CN435)
ethoxylated (4) pentaerythritol tetraacrylate (SR494)

The free-radically curable monomers in the inkjet ink compositions of the present invention preferably have borderline miscibility with the chosen solvent, and sufficient immiscibility when cured.

The currently preferred difunctional (meth)acrylate material is 1,6-hexanediol diacrylate (HDDA) (E.G. SR 238) particularly for use in hydrophobic inks. HDDA has the advantages of low viscosity, low volatility, high reactivity resulting in relatively fast curing rates, good adhesion properties on a wide range of substrates including non-porous materials such as plastics and other difficult materials, and excellent weathering properties. HDDA is suitably present in an amount in the range 40% to 80.0% by weight of the composition, preferably 45 to 65%.

Good results have also been obtained using a mixture of at least one monofunctional (meth)acrylate and at least one difunctional (meth)acrylate. Monomers in the first class have reasonable low viscosity, and produce printed films with good properties, e.g. in terms of hardness and water resistance. Monomers in the second class have higher viscosity, and produce good scratch resistant films. By using a mixture of the two classes of monomers, a good overall balance of properties can be achieved.

Good results have been obtained with a mixture of about 60.0% by weight HDDA (SR 238) and about 40.0% by weight IBOA (SR 506D).

The number of functionalities in the curable components affects the properties of the resulting cured films, with higher functionality components producing films with higher shrinkage, higher water/chemical resistance and increased durability. Higher functionality also provides fast cure response: components with 1 or 2 functional groups usually cure/polymerise slowly and require a greater ratio of initiator and longer exposure to curing conditions. Components with 3 or more functionalities increase cross linking density, chemical resistance, and scratch resistance of printed films, but have high viscosities and so should be used sparingly (typically at levels of 7 or 8% by weight or less). The tetra- and hexa-(meth)acrylates are currently preferred higher functionality materials for their balance of properties.

Optionally, multifunctional oligomers may be included in the inkjet ink composition in small amounts (typically 1-2% by weight, but not more than 15% by weight as they have high viscosities), in order to increase cross-linking density and improve reactivity and scratch resistance of the resultant films.

Suitable commercially-available materials include the following radiation-curable components available from Akzo Nobel: Actilane 450, 505, 515 and 579. Useful multifunctional components in this class include Actilane 450 and 505. (Actilane is a Trade Mark).

Actilane 505 has low viscosity, and undergoes fast radiation curing to form flexible films Actilane 450 (DPHA) imparts excellent properties to cured films, but has high viscosity.

Good results have been obtained with a mixture of 10.7% by weight Actilane 505 and 1.1% by weight Actilane 450 (DPHA) in a hydrophilic ink.

Viscosity values for various free-radically curable monomer materials are given below:

| Chemical Name | Commercial Name | Functionality | Viscosity (mPa·s)@ 25°C. |
|---|---|---|---|
| Polyester tetra acrylate | Actilane 505 (CN 2505) | 4 | 500-1000 |
| Tridecyl acrylate (TA) | SR 489 | 1 | 7 |
| Isodecyl acrylate (IDA) | SR 395 | 1 | 5 |
| 2-Phenoxy acrylate (PEA) | SR 339C | 1 | 11 |
| Lauryl acrylate (LA) | SR 335 | 1 | 6 |
| 2-(2-Ethoxy-ethoxy)ethyl acrylate (EOEOEA) | SR 256 | 1 | 5 |
| Tetrahydrofurfuryl acrylate (THFA) | SR 285 | 1 | 6 |
| Isobornyl acrylate (IBOA) | SR 506D | 1 | 10 |
| 1,6-Hexanediol diacrylate (HDDA) | SR 238 | 2 | 7 |
| Difunctional acrylate | SR 4423 | 2 | 15 |
| Dipropylene glycol diacrylate (DPGDA) | SR 508 | 2 | 8 |
| Tripropylene glycol diacrylate (TPGDA) | SR 306 | 2 | 15 |
| Propoxylated neopentyl glycol diacrylate (PONPGDA) | SR 9003 | 2 | 15 |
| Tetrahydrofurfuryl methacrylate (THFMA) | SR 203 | 1 | 5 |
| 2-Phenoxyethyl methacrylate (PEMA) | SR 340 | 1 | 10 |
| Isobornyl methacrylate (IBOMA) | SR 423 | 1 | 10 |
| Dipentaerythritol hexaacrylate (DPHA) | Actilane 450 | 6 | 3,000-4,000 |

Solvent

The solvent functions as a phase separation liquid for the curable material in the inkjet ink, and should be at least immiscible (at the temperature of curing) with the curable material after full or partial curing.

The amount of solvent in the ink is important in providing inks capable of producing images with good opacity. If the ink includes too little solvent it will not produce sufficient microvoids for the film to have an opaque appearance. However, if the ink includes too much solvent, the dried film will be too thin (after solvent removal) and will also not have good opaque qualities. The appropriate amount of solvent in any particular composition will depend on factors including the volatility of the solvent, the thickness of the film to be printed and the curing conditions, particularly curing speed and curing power to be employed, and one skilled in the art will be able to determine appropriate parameters.

In broad terms, the solvent should be present in an amount of at least 5% by weight of the ink, and may be present in an amount in the range 40 to 60%. Preferably the solvent is present in an amount of less than or equal to 50% by weight of the total weight of the ink, more preferably less than or equal to 45%, yet more preferably less than 35%.

The solvent may comprise a single material or a mixture of materials. In the case of a mixture, the boiling point is to be understood to be the temperature at which the mixture begins to boil.

It is generally preferred to avoid the use of low boiling point solvents as these may present a flammability hazard and may evaporate too quickly for the formation of the microvoids that are required for light scattering and hence opacity. Further, if the boiling point is too low the solvent will have a tendency to evaporate on print head nozzles resulting in non-reliable print head performance (i.e. very short decap times). It is preferred that the solvent has a boiling point of at least 120° C. as this enables greater control over evaporation. The solvent desirably has a boiling point in the range 120 to 350° C. The solvent preferably has a flash point of at least 60° C. (excluding materials classified as flammable).

It will be appreciated by persons skilled in the art that the use of low molecular weight hydrocarbon solvents such as hexane is nevertheless possible providing the temperature during curing is maintained below the boiling point of the solvent to ensure that the resulting film has sufficient chance to cure and thus give the required phase separation. The technology requires that the curing stage proceeds in the presence of enough solvent to allow phase separation to occur, with the boiling point ideally being chosen to allow full evaporation after a cure has been achieved.

Further, it is desirable for the solvent to have a low enough evaporation rate to reduce volatile emissions to the atmosphere, and to have a high enough evaporation rate to dry from the surface in a short period of time, and to evaporate completely at ambient conditions. It will be appreciated by persons skilled in the art that the volatility of the solvent used in the inks of the present invention should not be so high as to upset the carefully balanced curing of the curable components to achieve opaque films with good hiding power.

Solvent can be non-polar (or homopolar), and thus designed to be miscible with other non-polar curable components for use in hydrophobic inks, or polar, and therefore miscible with more polar curable components, for use in hydrophilic inks. In both cases, the polar and non-polar solvents are immiscible with the curable components when cured.

Hydrophobic Ink

It is appropriate to use a homopolor (i.e. a non-polar) solvent in a hydrophobic ink. Suitable homopolar solvents include aliphatic or aromatic hydrocarbon solvents which may be chosen from a wide variety of such solvents. Examples of aliphatic hydrocarbons are linear, cyclic or branched hydrocarbons, including cycloparaffinic hydrocarbons. Preferred hydrocarbons are linear or branched alkanes such as $C_{8-18}$ alkanes, preferably $C_{9-16}$ alkanes, more preferably $C_{9-12}$ alkanes or $C_{11-15}$ alkanes. A single non-polar solvent, or a mixture of two or more non-polar solvents, may be used. Often, however, a mixture of hydrocarbons is used since it is not necessary to use a single hydrocarbon and separation of different hydrocarbons is costly. Mixtures of long-chained alcohols, esters and ethers with at least six carbon atoms are commonly used as homopolar solvents. Particular examples of suitable phase separation liquids are aliphatic hydrocarbon solvents such as those sold under the trade names Exxsol, Solvesso, Exxon naphtha, Isopar (ExxonMobil Corp.) and Shellsol (from Shell Chemicals).

Preferred non-polar solvents are mixtures of $C_{9-12}$ and $C_{11-15}$ alkanes such as those commercially-available as Isopar G, Isopar H, Isopar J, Isopar K, Isopar M, Isopar L and Isopar MB, as well as mixtures of $C_{13-16}$ alkanes such as those commercially-available as Isopar P, and distillates commercially available as Isopar V. Most preferred non-polar solvents are the cycloparaffinic hydrocarbons commercially-available as Exxsol D60, Exxsol D80, Exxsol D100, Exxsol D100s, Exxsol D110, Exxsol D120 and Exxsol D140. The Exxsol materials are obtained from fractional distillation of natural or synthetic hydrocarbon mixtures.

Details of some of these commercially available solvent mixtures are given in the table below:

| Commercial Name | Boiling Point (° C.) | Flash Point (° C.) | Evaporation Rate (n-butyl acetate = 100) | Viscosity (mPa·s)@ 25° C. |
|---|---|---|---|---|
| Isopar G | 153-180 | 42 | 24 | 0.84 |
| Isopar H | 173-193 | 58 | 7.5 | 1.09 |
| Isopar J | 175-213 | 63 | 5.5 | 1.18 |
| Isopar L | 185-213 | 64 | 4.5 | 1.26 |
| Isopar M | 199-260 | 78 | <1 | 2.06 |
| Isopar P | 235-269 | 103 | <1 | 3.00 |
| Isopar V | 263-329 | 124 | <1 | 11.47 |
| Exxsol D60 | 180-217 | 63 | 3.4 | 1.43 |
| Exxsol D80 | 192-250 | 76 | 2 | 1.68 |
| Exxsol D100 | 240-267 | 102 | <1 | 2.59 |
| Exxsol D120 | 255-300 | 120 | <1 | 3.97 |
| Exxsol D140 | 275-315 | 136 | <1 | 6.30 mm$^2$/s |
| Solvesso 150 | 178-209 | 64 | 5.3 | 1.12 |
| Solvesso 200 | 220-290 | 101 | <1 | 3.16 mm$^2$/s |
| Shellsol D100 | 235-262 | 103 | <1 | 3.20 mm$^2$/s |

A preferred phase separation liquid comprises Exxsol D110 (ExxonMobil Corp.). Exxsol D100 is conveniently present in an amount of 5-80% by weight of the hydrophobic ink composition, more preferably 10-70% by weight of the composition. (Exxsol is a Trade Mark).

Hydrophilic Ink

The preferred solvents employed in hydrophilic ink compositions of the present invention comprise glycols and glycol ethers, as these solvents have low viscosities and high boiling points. Further, glycols and glycol ethers function as humectants, preventing drying in printhead nozzles. Diethylene glycol (DEG) is particularly preferred, with ethylene glycol (EG) and triethylene glycol (TEG) also being useful. Details of these glycols are given in the table below. Other suitable solvents include, but are not limited to the following: 1,4-butanediol, glycol ethers, particularly propylene glycol n-butyl ether, dipropylene glycol, tripropylene glycol, 2-methyl-1,3-propanediol, propylene glycol methyl ether, propylene glycol ethyl ether, dipropylene glycol methyl ether, dipropylene glycol n-butyl ether, tripropylene glycol methyl ether, tripropylene glycol n-butyl ether, propylene glycol methyl ether acetate, dipropylene glycol methyl ether acetate, propylene glycol n-propyl ether acetate, dipropylene glycol n-propyl ether, ethylene glycol n-butyl ether (or ethylene glycol monobutyl ether (EGMBE)), diethylene glycol n-butyl ether, triethylene glycol butyl ether, diethylene glycol methyl ether, triethylene glycol methyl ether.

| Commercial Name | Boiling Point (° C.) | Flash Point (° C.) | Evaporation Rate (n-butyl acetate = 100) | Viscosity (mPa·s)@ 25° C. |
|---|---|---|---|---|
| Ethylene glycol (EG) | 198 | 111 | <0.01 | 16.9 |
| Diethylene glycol (DEG) | 244-245 | 140 | <0.01 | 38.5 |
| Triethylene glycol (TEG) | 278-285 | 177 | 0.01 | 47.8 |

A preferred solvent comprises diethylene glycol (DEG), which may be present in an amount of 5% to 90% by weight of the hydrophilic ink composition, preferably 10% to 50%, more preferably 20 to 30%.

It will be appreciated by persons skilled in the art that solvents capable of use in the inks of the present invention are not limited by what has been particularly referred to above. Rather, ink compositions comprising other types of solvent are also possible for use in the present invention, while possibly being less preferred. It will therefore be appreciated that one or more flammable solvents may be used in the present invention. Examples of suitable flammable solvents include, but are not limited to: methyl lactate (boiling point of 139° C.; flash point of 52° C.; viscosity of 3.1 mPa·s, evaporation rate <1), ethyl lactate (boiling point of 149.3° C.; flash point of 61° C.; viscosity of 2.71 mPa·s, evaporation rate <1), Similarly, certain halogenated solvents may be used, although it will be appreciated by those persons skilled in the art that these are preferably avoided because of their toxicity.

The curable material should be selected for compatibility with the solvent, as will be apparent to those skilled in the art.

Initiators

Optionally, the ink composition may additionally comprise an initiator, generally a free-radical initiator, appropriate to the curable materials, e.g. a thermal initiator, photo-initiator etc. Suitable free-radical initiators with appropriate solubility in the curable material/solvent mixture are well-known to those skilled in the art, as are suitable levels of use (typically less than about 5% by weight). Examples of suitable free-radical photo-initiators include Irgacure 2959, 184, 651, 750, 500, 127, 1700, 1800, 819 (Ciba Specialty Chemicals), Darocur TPO, 1173 etc. (Irgacure and Darocur are Trade Marks). Examples of suitable thermal initiators include VA 044 (2,2'-azobis [2-(2-imidazolin-2-yl)propane] dihydrochloride), VA 057 (2,2'-azobis[N-(2-carboxyethyl)-2-methyl-propioamidine]) and VA086 (2,2'-azobis[2-methyl-N-2-hydroxyethyl)-propionamide]) from Wako Chemicals.

The free-radical initiators currently favoured include bis(2,6-dimethylbenzoyl)-2,4,4-trimethyl pentylphosphine oxide, and, 2-hydroxy-2-methyl-1-phenyl-1-propanone, and mixtures thereof.

Additives

In addition, if necessary, additives, such as rust preventives, fungicides, antioxidants, evaporation accelerators, chelating agents, and water-soluble polymers other than the above-described components, may be added to the inks used in the present invention.

Further details of conventional and optional additives for printing inks and their use are given, e.g. in U.S. Pat. No. 6,294,592.

It will be appreciated by persons skilled in the art that ink compositions of the present invention comprising other types of curable components and solvents, such as generic combinations of either: at least one curable polar polymer and at least one hydrocarbon solvent for the curable polar polymer; or at least one curable non-polar polymer and at least one polar solvent for the curable non-polar polymer; or at least one curable non-polar polymer and at least one halogenated solvent for the curable non-polar polymer, are all embodiments following within the scope of the present invention.

The transparent, single-phase ink composition of the present invention can be prepared by mixing the curable material, and one or more initiators for the curable material, if required, in sufficient quantity of solvent. In order for the ink to be discharged properly from the nozzle of an inkjet printhead without clogging, the quantities of the various components are adjusted so that the viscosity of the ink at room temperature (25° C.) will generally be 50.0 mPa·s or less, preferably ranging from 10.0 mPa·s to 35.0 mPa·s.

The inks of the invention are typically transparent, and after curing form opaque, usually white, films on a substrate when viewed in visible light. The inks find particular application as base layer coatings, on which coloured images may then be printed. The inks can have excellent colour reproducibility, hiding power and adhesion to a wide range of substrates, including semi-porous and non-porous substrates such as metals, glass, ceramics, rubber and plastics. The films can be resistant to moisture and wet rub and have good stability and shelf life. The inks can also exhibit good jetting reliability and need not hard settle nor cause corrosion of the print head. There is thus no need for use of an ink recirculation system.

The inkjet printed film is preferably formed so that its dry film thickness is between 1 and 100 µm. In terms of hiding power, curability and so forth, it is particularly favourable for the ink coating film to preferably be formed between 10 and 30 µm thick.

In the case of forming an ink receptive base layer, the ink coating film is preferably formed so that its dry thickness is at least 10.0 µm. In terms of hiding power, curability, and so forth, it is particularly favourable for the ink coating film to have dry thickness of at least 15 µm.

The invention also provides a method of forming an opaque image on a substrate, comprising depositing by inkjet printing an ink in accordance with the invention on a substrate; causing or allowing the curable material of the ink to cure by exposure to a suitable curing stimulus (preferably actinic radiation, particularly UV radiation) under conditions that result in evaporation of the solvent at a rate that results in formation of microvoids in the film that scatter light, producing an opaque image.

The ink is preferably applied by piezoelectric or thermal inkjet printing.

Curing factors including the strength of the energy source, cure time etc. are regulated appropriately to produce the desired effect.

The substrate is preferably semi-porous or non-porous.

The image is preferably in the form of a base layer coating on which a coloured image may subsequently be formed.

The image preferably has a dried film thickness of at least 10 µm, preferably at least 15 µm to give good hiding power.

The invention will now be further described, by way of illustration, in the following non-limiting examples.

EXAMPLES

In the examples, all quantities are % by weight unless otherwise specified.

A number of non-optimised test ink compositions in accordance with the invention were prepared to demonstrate the principle of the invention.

Measurement techniques were as follows:

Viscosity

Viscosity measurements were performed using a Brookfield DV-II+ viscometer operating with a rotational speed of 60 rpm at a temperature of 25° C. Briefly, 17.5 ml of ink was transferred to the chamber, to which a suitable spindle was then lowered into the chamber and left until the temperature stabilized. Measurements were taken every 30, 60, 120 and 300 seconds, until a reproducible viscosity reading could be obtained. [Units: 1 mPa·s=1 cP]

Surface Tension

Surface tension (γ) measurements were carried out using a White Electrical Instrument Co. torsion balance and a platinum ring. All measurements were carried out at 20-21° C. Solution temperatures were controlled by means of a thermostated water bath. Reproducibility was checked by frequent determination of the surface tension of deionised doubly-distilled water (72-73 dyne/cm).

Example 1

Radiation-curable inkjet ink compositions were made from the ingredients shown in the following table.

| | INK | | | |
|---|---|---|---|---|
| | HYDROPHOBIC | | | HYDROPHILIC |
| INGREDIENT | PB-A | PB-B | PB-C | PB-D |
| SR 238 (HDDA) | 76.0 | 63.4 | 47.5 | — |
| SR 339C (PEA) | — | — | — | 26.4 |
| SR 508 (DPGDA) | — | — | — | 34.3 |
| Actilane 505 (Polyester acrylate) | — | — | — | 10.7 |
| Actilane 450 (DPHA) | — | — | — | 1.1 |
| Irgacure 1700 | 4.0 | 3.3 | 2.5 | — |
| Irgacure 127 | — | — | — | 2.0 |
| Darocur TPO | — | — | — | 4.0 |
| Darocur ITX | — | — | — | 1.3 |
| Exxsol D100 | 20.0 | 33.3 | 50.0 | — |
| Diethylene glycol | — | — | — | 20.6 |
| Viscosity (mPa·s) | 5.60 | 4.86 | 4.22 | — |
| Surface Tension (dyne/cm) | 34.50 | 33.80 | 30.80 | — |
| Scratch resistance | 5 | 4 | 3 | 5 |
| Opacity | poor | good | Good | good |

The compositions were prepared by mixing together the curable monomers and initiators, and then gradually adding the solvent to the mixture. The resulting compositions were all in the form of transparent single-phase inkjet inks.

For simplicity, initial tests on the inks were performed by depositing samples onto clear Melinex polyethylene terephthalate (PET) film (Melinex is a Trade Mark) by draw down using a Grade 8 draw down bar to produce a film with a wet thickness of approximately 100 µm. The deposited ink was then cured by exposure to UV from a 500 W fusion light Hammer 6 system equipped with either an 'H' or 'D' bulb, being conveyed below the UV system and a line speed of 15 m/min (Fusion Light Hammer 6 is a Trade Mark). This resulted in the production of cured opaque films adhered to the Melinex substrate. The scratch resistance and opacity of the resulting films was assessed and ranked relative to each other (and not on an absolute scale) and the relative values assigned are shown in the table above. The opacity improved in the order PB-A<PB-B<PB-C.

Considering the results for inks PB-A, PB-B and PB-C, the opacity improved in the order PB-A<PB-B<PB-C, i.e. with increasing solvent content, while scratch resistance decreased with increasing solvent contact. It is thought that higher levels of solvent result in improved phase separation, hence void formation and opacity. However, at higher solvent levels some solvent remains in the cured film, which adversely affects film durability, as illustrated by scratch resistance. The scratch resistance and similar properties of these films can be improved by subjecting the films to a post-cure heating step, e.g. by exposure to an infra red lamp, hot air gun or by multiple passes under an UV lamp, to evaporate off retained solvent.

Although the opacity of PB-A is described as poor, it is nevertheless acceptable for some uses.

Example 2

Further single-phase radiation-curable hydrophobic inkjet ink compositions similar to PB-C, but using different grades of Exxsol solvent, were made and tested in similar manner. Details are shown in the following table.

| INGREDIENT | INK | | | |
|---|---|---|---|---|
| | PB-H | PB-I | PB-J | PB-K |
| SR 238 (HDDA) | 47.5 | 47.5 | 47.5 | 47.5 |
| Irgacure 184 | 2.5 | 2.5 | 2.5 | 2.5 |
| Exxsol D60 | 50.0 | — | — | — |
| Exxsol D140 | — | 50.0 | — | — |
| Exxsol D150 | — | — | 50.0 | — |
| Exxsol D200 | — | — | — | 50.0 |
| Viscosity (mPa·s) | 2.70 | 11.8 | 2.80 | 5.15 |
| Surface Tension (dyne/cm) | 28.5 | 30 | 34.5 | 37 |
| Scratch resistance | 5 | 4 | 3 | 2 |
| Opacity | best | good | poor | poor |

Both opacity and scratch resistance increased in the order PB-K<PB-J<PB-I<PB-H. The lower the D number of the Exxsol material, the lower the boiling point and flash point, and the best results were obtained with the Exxsol solvent having the lowest boiling point and flash point (Exxsol D60). It is thought that this is because as the Exxsol D value increases, more solvent remains in the cured film which has an adverse effect on both opacity and scratch resistance. Exxsol D60 has a flash point of 63° C. and so is not classed as flammable (flammable materials having a flash point<60° C.), yet it is still sufficiently volatile to evaporate at an appropriate rate to produce suitably sized microvoids to give a good opaque dried film.

Of the non-optimised hydrophobic inks tested so far, PB-B is currently favoured, with PB-H having similar performance properties.

The compositions of the invention may be inkjet printed in conventional manner, for example at 600×600 dpi using a piezoelectric inkjet printer equipped with a Xaar XJ128 printhead (Xaar, Cambridge, UK) for single pass printing (higher resolution images (600 dpi) achieved in two passes), and then cured by exposure to UV from a 500 W Fusion Light Hammer 6 system equipped with either an 'H' or 'D' bulb, being conveyed below the UV system at a line speed of 30 m/min. (Fusion Light Hammer 6 is a Trade Mark). An additional drying step may also be required, e.g. exposure to an infra red lamp, heat gun, or multiple passes under a UV lamp.

The compositions may be printed onto a variety of substrates, and find particular use with non-porous and semi-porous substrates such as metals, glass, ceramics, rubbers, plastics (e.g. polyesters such as polyethylene terephthalate (PET), low density (LD) polyethylene, and orientated polystyrene, high density (HD) polyethylene, acrylonitrite butadiene styrene (ABS), polypropylene, polyvinyl chloride (PVC), polycarbonate, polyimide film) etc.

Even on difficult to handle non-porous substrates, the invention can provide compositions that are fast drying and produce good quality prints of high durability. In particular, the resulting prints may satisfy the requirements of good scratch resistance, wetfastness, and flexibility. The ink compositions of the present invention find particular application in commercial printing onto semi-porous and non-porous substrates.

The degree of opacity of the inkjet printed film is dependent on the thickness of the film. It is found that achieving a good white effect with thin coatings is restricted due to poor phase separation or probably faster solvent evaporation before the optimal effect is achieved.

Composition PB-B is the preferred formulation. As well as having excellent jetting reliability and good start-stop performance (i.e. where a print head can be left idle after a period of continuous printing and on re-starting printing is readily recoverable), radiation curing of the inkjet printed features afforded a white porous opaque film that was scratch resistant when coated at a thickness of 12 μm.

The invention claimed is:

1. A single-phase radiation-curable inkjet ink for producing opaque images on a substrate, comprising
   at least one curable material; and
   at least one solvent in which the curable material is soluble or miscible and in which the curable material after full or partial curing is insoluble and immiscible, resulting in phase separation and production of opaque film, wherein the solvent is a non-polar aliphatic hydrocarbon solvent, a glycol, a glycol ether, or a combination thereof, and wherein the solvent has a boiling point of at least 120° C.

2. An ink according to claim 1, wherein the solvent is present in an amount of less than or equal to 45% by weight of the weight of the ink.

3. An ink according to claim 1, wherein the curable material comprises one or more acrylate monomers.

4. An ink according to claim 3, wherein the one or more acrylate monomers comprises diacrylate monomer present in an amount in the range between 25 to 80% by weight, by weight of the ink composition.

5. An ink according to claim 4, wherein the diacrylate monomer comprises one or more of: 1,6-hexanediol diacrylate, dipropylene glycol diacrylate, tripropylene glycol diacrylate, propoxylated neopentyl glycol diacrylate, 1,3-butylene glycol diacrylate, 1,4-butanediol diacrylate, tetraethyl glycol diacrylate and triethylene glycol diacrylate.

6. An ink according to claim 5, wherein the acrylate monomer comprises: one or more monofunctional acrylate monomers; and one or more multifunctional acrylate monomers.

7. An ink according to claim 6, wherein the monofunctional acrylate monomer comprises one or more of tridecyl acrylate, isodecyl acrylate, 2-phenoxyethyl acrylate, lauryl acrylate, 2-(2 ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, and isobornyl methacrylate.

8. An ink according to claim 7, wherein the multifunctional acrylate monomer comprises dipentaerythritol hexaacrylate.

9. An ink according to claim 1, wherein the non-polar aliphatic hydrocarbon solvent is selected from: non-polar solvent mixtures of $C_{9-12}$ and $C_{11-15}$ alkanes, non-polar solvent mixtures of $C_{13-16}$ alkanes, and cycloparaffinic hydrocarbons.

10. An ink according to claim 1, wherein the glycol or glycol ether comprises one or more of: ethylene glycol, propylene glycol, diethylene glycol, and triethylene glycol.

11. A method of forming an opaque image on a substrate, comprising depositing by inkjet printing an ink according to claim 1 on a substrate; causing or allowing the curable material of the ink to cure by exposure to a suitable curing stimulus under conditions that result in evaporation of the solvent at a rate that results in formation of microvoids in the film that scatter light, producing an opaque image.

12. The method according to claim 11, wherein the substrate is non-porous.

* * * * *